United States Patent
Koshida et al.

(10) Patent No.: US 7,456,238 B2
(45) Date of Patent: Nov. 25, 2008

(54) FABRICATED RESIN PRODUCTS FOR LASER WELDING AND INCLUDING TRANSMITTING AND ABSORBING BLACK COLORANTS, AND COLORED RESIN COMPOSITIONS THEREFOR

(75) Inventors: Reiko Koshida, Utsunomiya (JP); Yoshiteru Hatase, Osaka (JP); Ryuichi Hayashi, Tokyo (JP)

(73) Assignees: E.I. du Pont de Nemours and Company, Wilmington, DE (US); Orient Chemical Industries, Ltd., Neyagawa (JP)

( * ) Notice: Subject to any disclaimer, the term of this patent is extended or adjusted under 35 U.S.C. 154(b) by 233 days.

(21) Appl. No.: 11/044,930

(22) Filed: Jan. 27, 2005

(65) Prior Publication Data

US 2005/0137325 A1    Jun. 23, 2005

Related U.S. Application Data

(63) Continuation of application No. 10/053,129, filed on Nov. 13, 2001, now abandoned.

(60) Provisional application No. 60/247,648, filed on Nov. 13, 2000.

(51) Int. Cl.
*C08K 3/04* (2006.01)

(52) U.S. Cl. .................. 524/495; 524/601

(58) Field of Classification Search ............... 524/495, 524/601
See application file for complete search history.

(56) References Cited

U.S. PATENT DOCUMENTS

| | | | |
|---|---|---|---|
| 5,893,959 A | 4/1999 | Muellich | |
| 6,220,673 B1 | 4/2001 | Russell | |
| 6,759,458 B2 * | 7/2004 | Reil | 524/89 |

* cited by examiner

*Primary Examiner*—Edward J Cain

(57) ABSTRACT

Novel fabricated resin products are described and having suitability for laser welding applications. These contain a resin part for transmitting black colorant and a resin part for absorbing black colorant.

1 Claim, 2 Drawing Sheets

FABRICATED RESIN PRODUCTS FOR LASER WELDING AND INCLUDING TRANSMITTING AND ABSORBING BLACK COLORANTS, AND COLORED RESIN COMPOSITIONS THEREFOR

This application claims the benefit of U.S. Provisional Application No. 60/247,648, filed Nov. 13, 2000, and is a continuation of U.S. application Ser. No. 10/053,129, filed Nov. 13, 2001, now abandoned.

FIELD OF THE INVENTION

This invention relates to fabricated resin products useful for laser welding applications, where laser light melt-bonds a portion of or all of the contact surfaces of multiple resin parts. More particularly, this invention pertains to fabricated resin products for laser melt-bonding where the contact surface between resin parts having laser-transmitting black colorants and laser-absorbing black colorants respectively is welded.

BACKGROUND OF THE INVENTION

In recent years many fabrication methods have been designed to form complicated shapes of resin compositions such as the hollow parts and tubes in various industrial applications. However, there are certain limitations to these existing methods.

Many fabrication methods rely on adhesives for their sealing properties, but these are time-consuming and costly, and pose environmental concerns due to the use of volatile solvents. Ultrasonic welding or spin welding suffer from limitations on the shape and size of the objects bonded together, and occasionally show insufficient bonding strength. Vibration welding is often unattractive due to the inability to effectively control product appearance and flash, thereby limiting usage to certain applications.

Hence, the laser welding is increasingly attractive as a new method to better cope with these drawbacks. In laser welding, a laser light is irradiated through a transmitting resin material onto an absorptive resin material attaching to the resin material. The energy of the laser light accumulated on the contacting part of the absorptive resin material heats and melts the contacting part and the transmitting resin material is also heated and melted through heat transfer. The result of this operation is that the resin materials are easily and strongly joined together.

Another benefit to laser welding is that it increasingly offers freedom of choice in designing the shape of the joined articles because energy is applied in a noncontact fashion for the finishing product to be melted/bonded.

Several important laser welding methods rely on Nd:YAG lasers (or known simply as YAG lasers) or diode lasers as the laser beam source, and these lasers emit light in the near infrared region. The diode laser techniques have become particularly advanced in recent years and diode lasers with higher output power can be obtained at lower cost.

Many materials may benefit from welding techniques using such lasers. For example, polyethylene resin, polypropylene resin, polystyrene resin, polycarbonate resin, acrylic resin and nylon resin have been demonstrated as effective candidates for laser welding. Thermoplastic resin compositions useful in laser welding are described, for example, in Japanese Published (Koukoku) Patent No. 62-49850 and Japanese Published (Koukoku) Patent No. 5(93)-42336. Other resin compositions associated with the laser welding are described in U.S. Pat. No. 5,893,959 in which carbon black or nigrosine is used as a colorant for thermoplastic resin.

If there are many efforts directed to the laser welding of nylon resins. In conventional laser welding, laser beams penetrate through a laser transmitting article positioned close to a laser beam source, and are largely absorbed in the laser absorbing article disposed in contact with the laser transmitting article. This causes the junction portion to be melted and jointed together. However, non-colored resins have been used as the transmitting resin material. The use of such materials limits their applicability for articles of various colors demanded in the automotive industry and electric/electronic industries. Of particular interest, the use of black material in these applications is not satisfactorily popularized at this time using conventional laser welding operations. Additionally, there are some suggestions that black pigment can be diluted and utilized in part of the transmitting resin or even using materials in a thinner shape to facilitate transmission. However such approaches cannot ensure the satisfactory appearance of the resulting part and do not allow much flexibility in designing parts. There are still other examples suggesting the addition of carbon black to the absorptive resin as an approach. However the details of such an approach are not yet fully understood or functional.

The present invention provides a thermoplastic resin composition capable of offering molded articles which appear in black, are transparent to a laser beam at wavelengths in the infrared region. As another feature, it provides a substantially homogenous visual black impression in combination with opaque articles that appears in black and absorbs the laser beam largely by containing black dyes, welded together by the laser beam. These materials offer advantages in excellent and balanced heat-resistance and mechanical properties as required in automotive parts, electric/electronic components, mechanical components, and many other applications. These and other objects, features and advantages of the invention will become better understood upon having reference to the following description of the invention.

SUMMARY OF THE INVENTION

The present invention for achieving the aforementioned purpose provides fabricated resin products for laser welding, with a resin part containing laser-transmitting black colorant and a resin part containing laser-absorbing black colorant, and where laser light is utilized to melt-bond a part or all of the contact surface of the two resin parts.

A fabricated resin product is provided for laser welding comprising:

a first laser beam transmitting resin part comprising laser-beam transmitting black colorant which absorbs visible light of wavelength of less than 700 nm, and transmits a laser beam at wavelength in the range of 800 nm to 1200 nm, and a second laser beam absorbing resin part comprising laser-beam absorbing black colorant, wherein said first resin part is joined to said second resin part by a laser beam transmitted through said first resin part and absorbed in said second resin part.

There is also provided a resin composition for laser transmission for which the transmission rate ratios ($T_{black\ resin\ for\ laser\ transmission}/T_{natural\ resin}$) are 0.5-1.2 when the transmission rates of the resin composition containing the black colorant for laser transmission are compared to the transmission rates of the resin composition not containing said black colorant for laser transmission (natural resin) at 1064 nm and at 940 nm.

And the present invention for achieving the aforementioned purpose provides a resin composition for laser absorption for which the transmission rate ratio ($T_{black\ resin\ for\ laser\ absorption}/T_{natural\ resin}$) is 0-0.2 when the transmission rate of the resin composition containing the black colorant for laser absorption is compared to the transmission rate of resin composition not containing said black colorant for laser absorption (natural resin).

BRIEF DESCRIPTION OF THE DRAWINGS

The invention will become better understood upon having reference to the drawings herein. In general, the figures depict a laser welding test method in which welding strength between the laser transmitting (transparent) article and laser absorbing (opaque) article welded together by a laser welding is measured.

DETAILED DESCRIPTION OF THE INVENTION

Figure 1A:
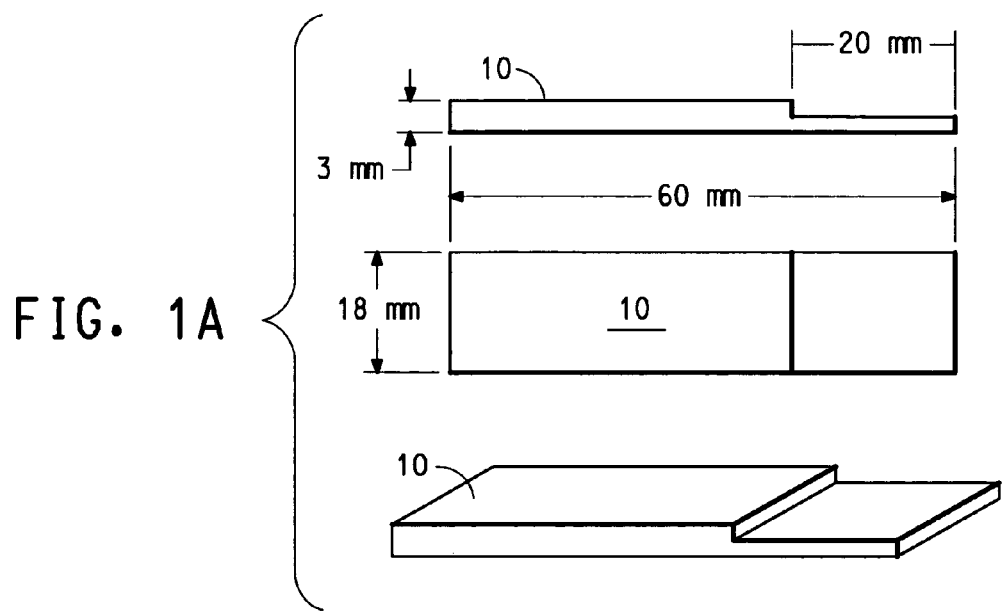
FIG. 1(A) illustrates a shape and dimensions of the test piece for the laser welding test with Examples 37-49 and Comparative Example 50.

Useful lasers to weld the molded resin products of the present invention may be any lasers having light emissions in the near infrared region. Particularly, lasers emitting light of wavelengths from 800-1200 nm are preferred, and diode lasers and YAG lasers are particularly preferred. Lasers may be utilized singly or in combination with each other, as will be appreciated among those having skill in the art of laser operation. The laser emissions may be continuous or pulsed, with continuous emissions being preferred.

With respect to the resin materials subject to the laser welding, there is provided one resin material that is laser-transmitting and another resin material that is laser-absorptive. By irradiating a laser light through the transmitting resin material onto the absorptive resin material attached thereto, the energy of the laser light accumulated on the contact surface of the absorptive resin material heats and melts the contact area. The transmitting resin material is also heated/melted through heat transfer, so that the resin materials are easily and strongly bonded together. The laser light may directly irradiate the welding area or may be guided to the contact area using an optical apparatus such as a mirror or optical fiber. These and other techniques are employed as appropriate to the individual welding operation, and are selected by those having skill in this field.

The intensity, density and irradiating area of the laser is selected to appropriately carry out the heating and melting of the bonding surface. These are adjusted in such as a way that the resulting bonding is obtained with the strength required for the application of interest. If it is too weak, a sufficient heating melting cannot be realized. Conversely if it is too strong, degradation of resin may be induced.

The instant invention pertains to the junction portion of two molded articles (being respectively laser-transmitting and absorbing) positioned in contact with each other, in which a predetermined amount of laser beam is focused and transmitted, is melted and bonded. If a multiple number of points, lines or surfaces are to be welded, the laser light may be moved in sequence to irradiate the bonding surface, or a multiple laser sources may be used to irradiate simultaneously.

The molded resin products suitable for laser welding can be obtained by any methods including extrusion molding and injection molding. It only requires that the molded product made with transmitting resin for the laser utilized is in close contact with the molded product made with the absorptive resin for the laser utilized. If necessary, pressure can be further applied on the bonding surface.

Also, the bonded resin products suitable for welding by laser may be a combination of more than two parts.

For example, the invention is applicable to operations requiring one to weld more than 2 parts in one laser welding operation, or to weld complex configured article(s) by performing laser welding in part successively.

The transmitting resin and the absorptive resin may be of the same or different resins.

Also, the method may be applied in combination with or instead of other bonding methods.

For example portions of materials to be joined together and where bonding techniques other than laser welding cannot be used (because of its configuration or dimensions, etc.) may be subject to laser welding.

The resins utilized as the molded resins for laser welding may be any resin as long as they are thermoplastic resins. Polyamide resins and polyester resins are preferred from the point of view of heat-resistance and transmitting property, although other thermoplastic resins including polycarbonate resins can be used as well, alone, in combination with each other, or in combination with those preferable resins above.

Several examples of polyamide resins suitable for use in the present invention include condensation products of dicarboxylic acids and diamines, condensation products of aminocarboxylic acids and ring-opening polymerization products of cyclic lactams. Examples of dicarboxylic acids useful in this application include adipic acid, azelaic acid, sebacic acid, dodecanedioic acid, isophthalic acid and terephthalic acid. Examples of suitable diamines include tetramethylene diamine, hexamethylene diamine, octamethylene diamine, nonamethylene diamine, dodecamethylene diamine, 2-methylpentamethylene diamine, 2-methyloctamethylene diamine, trimethylhexamethylene diamine, bis(p-aminocyclohexyl) methane, m-xylene diamine and p-xylene diamine. As an example of aminocarboxylic acid, 11-aminododecanoic acid can be used. Examples of useful cyclic lactams include caprolactam and laurolactam. Specific examples of condensation products and ring-opening polymerization products include aliphatic polyamides such as nylon 6, nylon 66, nylon 46, nylon 610, nylon 612, nylon 11, nylon 12, semi-aromatic polyamides such as polymetaxylene adipamide (nylon MXD-6), polyhexamethylene terephthalamide (nylon 6T), polyhexamethylene isophthalamide (nylon 6I) and polynonamethylene terephthalamide (nylon 9T), and copolymers and mixtures of these polymers. Examples of useful copolymers include nylon 6/66, nylon 66/6I, nylon 6I/6T and nylon 66/6T.

A wide range of common polyester molding compositions useful for blending with colorants in the practice of the present invention are known in the art. These include polymers which are, in general, condensation products of dicarboxylic acids and diols. Dicarboxylic acids can be selected from the group consisting of adipic acid, azelaic acid, sebacic acid, dodecanedioic acid, terephthalic acid, isophthalic acid, naphthalenedicarboxylic acid and diphenyl dicarboxylic acid, and diols can be selected from the group consisting of ethylene glycol, propylene glycol, butanediol, hexanediol, neopentyl glycol, cyclohexanediol, and bisphenol A. Preferred polyesters include polyethylene terephtalate (PET), polypropylene terephthalate (3GT), polybutylene terephthalate (PBT), polyethylene 2,6-naphthalate (PEN), polycyclohexane dimethylene terephthalate (PCT) and copolymers and mixtures thereof. As the examples of the copolymers, some of dicarboxylic acids or some of diols can be added to the condensation products. Polyester polymers may be copolymerized a little amount of components like trimesic acid, trimellitic acid, pyromellitic acid, glycerol, and pentaerythritol which have more than 3 functional groups. Additional other polymers including polycarbonate can also be presented, provided that the essential characteristics of the composition of the present invention are not substantially altered.

The resin composition for laser transmitting utilized in the fabricated resin products for laser welding contain at least a laser-transmitting black colorant and thermoplastic resin.

The amount of incorporation of the laser-transmitting black colorants in the resin compositions for transmission is 0.01-15 weight percent, and preferably 0.05-5 weight percent, versus based upon 100 weight percent thermoplastic resin.

The laser-transmitting black colorants utilized in the present invention show absorption in the visible light region (400-700 nm) and have transmitting property from the diode laser to the near YAG laser area (800-1200 nm).

All dyes that show partial absorption in the visible light region (400-700 nm) and have transmitting properties from the diode laser to the near YAG laser area (800-1200 nm) can be utilized as the aforementioned black colorant. As an example, blending two or more of such dyes having a single structure for absorption in the visible light region to give a mixed black color dye having absorption in the visible light region may be used.

There are many examples of combinations of mixed dyes useful in this invention. For instance, the combination of blue dye, red dye and yellow dye; the combination of green dye, red dye and yellow dye; the combination of blue dye, green dye and red dye and yellow dye; and the combination of green dye, violet dye and yellow dye can be used. However, the ratio of incorporation for each dye is appropriately adjusted based on the color tone of the dye, the resin utilized and the concentration (or the thickness of the resin) utilized. Generally, the dyes which exhibit blue, violet and green colorant can be main components to produce the black dyes. They may be used one or more two and be included more than 50% in the black dyes.

Of particular significance, the black colorant for laser transmission shows high transmitting properties near the YAG laser region and when the transmission rate ratio ($T_{black\ resin\ for\ laser\ transmission}/T_{natural\ resin}$) is 0.5-1.2, preferably 0.8-1.2. This occurs when the transmission rate of the resin composition containing the black colorant for laser transmission is compared to the transmission rate of the resin composition not containing said black colorant for laser transmission (natural resin) at 1064 nm.

The transmission rates of the aforementioned resin compositions for laser transmission are preferably between 940 and 1064 nm.

Of particular significance, when anthraquinone blue-violet dyes are chosen and blended with at least one dye absorbing in the visible light region outside the visible light region of the aforementioned anthraquinone dyes, the resulting mixed black colorant exhibits high transmission in the diode laser region. The transmission rate ratio ($T_{black\ resin\ for\ laser\ transmission}/T_{natural\ resin}$) in such cases is more than 0.5, preferably 0.8-1.1, when the transmission rate of the resin composition containing the black colorant for laser transmission is compared to the transmission rate of the resin composition not containing said black colorant for laser transmission (natural resin) at 940 nm. Hence, it is suitable for laser welding with a diode laser.

As examples of the dyes to obtain black colorant for laser transmission monoazo complex dyes, anthraquinone dyes, perinone dyes and quinophthalone dyes can be used. In the present invention, these dyes can be used singly or in combination.

By changing the structure of the aforementioned anthraquinone dyes, various colors such as yellow, red, blue, violet and green color can be shown, and they can be used singly or in combinations of two or more dyes. By using the blue color, violet color, or green color of the aforementioned anthraquinone dyes as the dye for the longer wavelength side of the visible light and by mixing at least one dye of the short wavelength region of the visible light, black colorants having excellent transmission in the entire region of the diode laser to near YAG laser (800-1200 nm) can be obtained. However, the ratio of incorporation for each dye is appropriately adjusted based on the color tone of the dye, the resin utilized and the concentration (or the thickness of the resin) utilized.

As an example of a preferred formulation, a black colorant containing at least an anthraquinone blue or green dye and perinone red dye, and black colorant containing at least an anthraquinone blue or green dye and monoazo complex red dye can be used. The aforementioned formulations may contain yellow dyes, preferably anthraquinone yellow dyes.

Specific examples of anthraquinone dyes are as follows. These are merely representative of a wider selection of dyes that may be used:
Green dye: C.I. Solvent Green 3, 20, 22, 23, 26, 28, 29
Blue dye: C.I. Solvent Blue 11, 13, 14, 35, 36, 59, 63, 69, 94, 132
 C.I. Vat Blue 4, 6, 14
Violet dye: C.I. Solvent Violet 12, 13, 14, 31, 34
Red dye: C.I. Solvent Red 52, 111, 114, 152, 155
Yellow dye: C.I. Solvent Yellow 163
 C.I. Vat Yellow 1, 2, 3

By changing the structure of the aforementioned monoazo complex dyes, various colors such as yellow, red, blue, violet, and black can be shown, and they can be used singly or in a combination of two or more dyes. The aforementioned monoazo complex dyes have high heat resistance and light resistance, and the molding property and color tone for thermoplastic resins are excellent. For example, the monoazo complex dyes represented by the following Formula (a) are obtained by carrying out metallization of A-N=N-B monoazo dyes. The A-N=N-B monoazo dyes are compounds obtained by carrying out diazotization on the A component and coupling on the B component. When pyrazolone derivatives or acetoacetanilide derivatives are used as B components, yellow-red monoazo complex dyes are obtained, and when naphthol derivatives are used as B components, blue-black monoazo complex dyes are obtained. Monoazo complex dyes using naphthols as the B components show high transmission properties near YAG laser. In other words, black colorants having excellent transmission in the entire region of near YAG laser (1000-1200 nm) can be obtained by using the aforementioned monoazo complex dyes alone or by mixing it with at least one dye with an absorption peak at a shorter wavelength while having good transmission in the range of 800-1200 nm. However, the ratio of incorporation for each dye is appropriately adjusted based on the color tone of the dye, the resin utilized and the concentration (or the thickness of the resin) utilized.

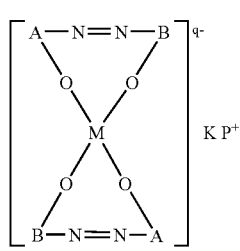

Formula (a)

In the formula, A represents an aromatic residual group optionally having substituents, and B represents a pyrazolone derivative residual group or acetoacetanilide derivative residual group or naphthol derivatives residual group optionally having substituents. M is a metal, $P^+$ is a cation, q is an integer 0-2, and K is an integer 0-2.

As the counter ions $P^+$ of the aforementioned monoazo complex dyes, cations based on $H^+$; $NH_4^+$; alkali metals (Na, K, etc.), cations based on organic amines (primary fatty amines, secondary fatty amines, tertiary fatty amines); and quaternary organic ammonium ions can be used.

As the center metal M of the aforementioned monoazo complex dyes, various metals may be used. As the more preferred ones, metals having divalent to tetravalent atomic values can be used. As the specific examples, Zn, Sr, Cr, Cu, Al, Ti, Fe, Zr, Ni, Co, Mn, B, Si, and Sn can be used.

Specific examples of monoazo complex dyes are as follows. These are merely representative of a wider selection of dyes that may be used:
Black dye: C.I. Solvent Black 21, 22, 23, 27, 28, 29, 31
  C.I. Acid Black 52, 60, 99
Blue dye: C.I. Acid Blue 167
Violet dye: C.I. Solvent Violet 21
Red dye: C.I. Solvent Red 8, 83, 84, 121, 132
  C.I. Acid Red 215, 296
Orange dye: C.I. Solvent Orange 37, 40, 44, 45
  C.I. Acid Orange 76
Yellow dye: C.I. Solvent Yellow 21, 61, 81
  C.I. Acid Yellow 59, 151

Perinone dyes are durable dyes having excellent heat stability, and also having excellent processing properties and color tone for thermoplastic resins. The dyes showing red color are particularly useful because there are very few red dyes having good durability.

A variety of perinone dyes can be used, among them:
Violet dye: C.I. Solvent Violet 29
Red dye: C.I. Solvent Red 135, 162, 178, 179
  C.I. Vat Red 7
Orange dye: C.I. Solvent Orange 60, 78
  C.I. Vat Orange 15

Among the aforementioned perinone dyes and pigments, the preferred dyes are identified considering their solubility and dispersion properties in the thermoplastic resin. For example, when dye(s) in powder form and resin(pellets) are mixed in a mixer then such mixture is injection molded to prepare a test piece as discussed in various examples it could be observed that the dye(s) is well dissolved and dispersed in the resin.

Quinophthalone dyes have excellent shine appearance and are able to give brilliant yellow color.

As specific examples of useful Quinophthalone type dyes,
Yellow Dye: C.I. Solvent Yellow 33 and 157 may be used.

It is preferable that the colorants utilized in the present invention contain minimal inorganic salts. In the synthesis process of dyes used in the present invention, inorganic salts are often formed in reaction. Contamination of the inorganic salts of the colorants in the resin compositions suppresses the growth of crystals. In the case when there is high inorganic salt content, it becomes particularly easy for the molded products to have cracks and deteriorating mechanical properties. Therefore, it is preferable that the inorganic salts are removed as much as possible by a treating after reaction. As examples of the aforementioned inorganic salts, chlorides of alkali metals (Li, Na, K, etc.) or alkaline-earth metals (Ba, Ca, Sr, etc.), lead sulfate, hydroxides can be cited.

It is preferable that the aforementioned inorganic salts are contained in amounts under 2 percent and more preferably and under 1 percent or 0.5 percent.

It is necessary to eliminate the metals in the dye materials serving as the dyes for the colorants utilized in the present invention, as well as completely eliminating the salts formed and the catalysts used in the reaction as much as possible. Also, it is preferred to use deionized water from which metals in the industrial water or tap water are removed, to prevent the contamination by Ca or Fe. Particularly, it is preferable that Ca is under 5000 ppm, and more preferably under 3000 ppm.

The black colorants used for the absorbing part in the present invention contain one or more dyes or pigments, which do not transmit in the visible wavelength region, and of which at least one absorbs laser light in the wavelength region from about 800 nm to about 1200 nm.

A number of laser-absorbing compounds known in the art can be utilized in the instant invention. Representative examples include carbon black, azine compounds, phthalocyanine compounds, polymethine compounds (cyanine compounds, pyrylium compounds, thiopyrylium compounds, squalilium compounds, croconium compounds, azulenium compounds), diinmonium compounds, dithiol metal complex salt compounds (M=Ni, Fe, etc.), indoaniline metal complex compounds and mercaptonaphthol metal complex salt compounds. The preferred compounds are carbon black, azine compounds (nigrosine dyes, aniline black) and phthalocyanine type compounds and mixtures thereof.

As examples of dyes or pigments having absorption in the visible light region (400-700 nm) as well as from diode laser to near YAG laser (800-1200 nm), carbon black, nigrosine compounds and aniline black can be used. The aforementioned dyes or pigments can color a resin black as appearance, highly absorbing laser properties and having excellent laser welding by heating. However, the ratio of incorporation for each dye is appropriately adjusted based on the color tone of the dye, the resin utilized and the concentration (or the thickness of the resin) utilized. The selection of dye(s) and the amount of them can be determined according to the application of interest and the properties associated with the laser welding.

The amount of the laser-absorbing colorant used in the resin composition for absorption is 0.01-15 weight percent, preferably 0.05-5 weight percent, based on 100 weight percent of thermoplastic resin. When the amount of the laser absorbing colorant is smaller than 0.01% in the resin composition, sufficient heat generation and melting does not take place and welding cannot be achieved. Using too much amount of laser-absorbing black colorant in the resin composition is not cost effective and yields excessive heat which causes degradation of the resin composition.

In the resin composition used for laser absorption of the present invention, it is preferable that the transmission rate ratio ($T_{black\ resin\ for\ laser\ absortion}/T_{natural\ resin}$) is 0-0.2 when the transmission rate of the resin composition containing the black colorant is compared to the transmission rate of resin composition not containing said black colorant for laser absorption (natural resin).

The resin compositions for laser absorption and the resin compositions for laser transmission of the present invention may optionally contain a suitable amount of various fiber reinforcing materials. Glass fiber is preferred for a reinforced resin having a transparency requirement. Glass fibers, alkali-containing glass, low-alkali glass and nonalkali glass can all be used. The preferred glass fibers are variously known as E glass and T glass. The length and the diameter of the glass fiber that is suitably utilized are 2-15 mm and 1-20 μm, respectively. There are no particular restrictions to the shape of the glass fiber, and for example roving fiber and milled fiber can both be used. These glass fibers may be used alone or in a combination of two or more materials. The fiber reinforcing materials are preferably incorporated in an amount of 5-120 weight percent with respect to 100 weight percent of thermoplastic resin. If this amount is under 5 weight percent, it would be difficult to give sufficient reinforcement from the glass fiber, and if it is over 120 weight percent, the processing property is easily reduced. It is preferable to use levels of 5-100 weight percent, and most preferably 15-85 weight percent.

The resin compositions for laser absorption and the resin compositions for laser transmission of the present invention may optionally be blended with various additives if necessary. As examples of such additives, auxiliary colorants, dispersants, fillers, stabilizers, plasticizers, modifiers, UV absorbers or light stabilizers, antioxidants, antistatic agents, lubricants, releasing agents, crystallization promoters, nucleating agents, fire retardant, and elastomers for improving impact-resistance can be incorporated therein. These materials are added according to conventional techniques and in amounts readily understood by those of skill in the art.

The resin compositions for laser absorption and the resin compositions for laser transmission of the present invention can be obtained by blending the raw materials using conventional blending methods, again as is understood by those of ordinary skill in the art. These blending components in general are preferably made homogeneous as much as possible. As a specific example, all the materials are mixed to homogeneity using a mixer such as a blender, kneader, Banbury mixer, roll extruder, etc. to give a resin composition. Or, part of the materials are mixed in a mixer, and the rest of the materials are added and further mixed until homogeneity to yield a resin composition. Also, the materials are dry-blended in advance and a heated extruder is used to melt and knead until homogeneous, and is extruded in a needle shape, followed by cutting them to a desirable length to become colored granulates (known as a colored blend).

The master batches of the resin compositions for laser absorption and the resin compositions for laser transmission of the present invention can be obtained by any of a series of conventional methods as understood by those having skill in the art. For example, they can be obtained by mixing powders or blends of thermoplastic resins serving as the base materials for the master batches in a mixer such as a tumbler or super mixer, followed by heating and melting using a extruder, a batch kneader or a roll kneader to give pellets of rough granulates. Also, for example, they can be obtained by adding colorants to the synthesized or liquid thermoplastic resin for the master batch, followed by removing the solvent to give a master batch.

Molding of the resin compositions for laser absorption and the resin compositions for laser transmission of the present invention can be carried out by various general methods. For example, molding can be carried out with fabricating machines such as extruders, inject molders and roll mill, using colored pellets. Also, molding can be carried out by mixing pellets or powder of thermoplastic resin having transparency, pulverized colorants and various additives according to needs with an appropriate mixer, followed by using a finishing machine. Also, for example, colorants can be added to monomers containing polymerization catalysts to prepare the desired thermoplastic resin by polymerizing this mixture and then carry out its molding using an appropriate method. As the examples of the molding method, the generally utilized molding methods such as injection molding, extruding molding, pressing molding, foaming molding, blow molding, vacuum molding, injection blow molding, rotation molding, calendar molding and solution casting molding can be utilized.

Figure 1B:
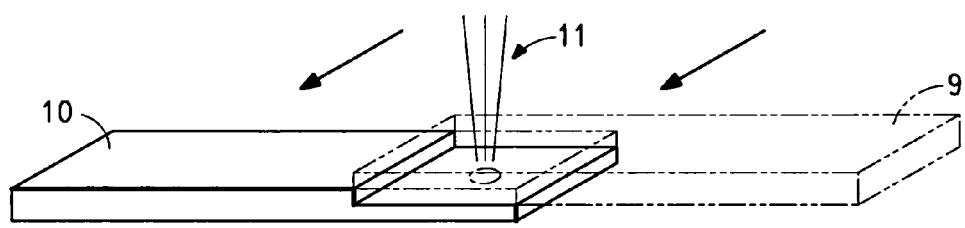
FIG. 1(B) is a perspective view of test pieces disposed close to each other for a laser welding test and relationship between the test pieces and laser beam with Examples 37-49 and Comparative Example 50.
Figure 2A:
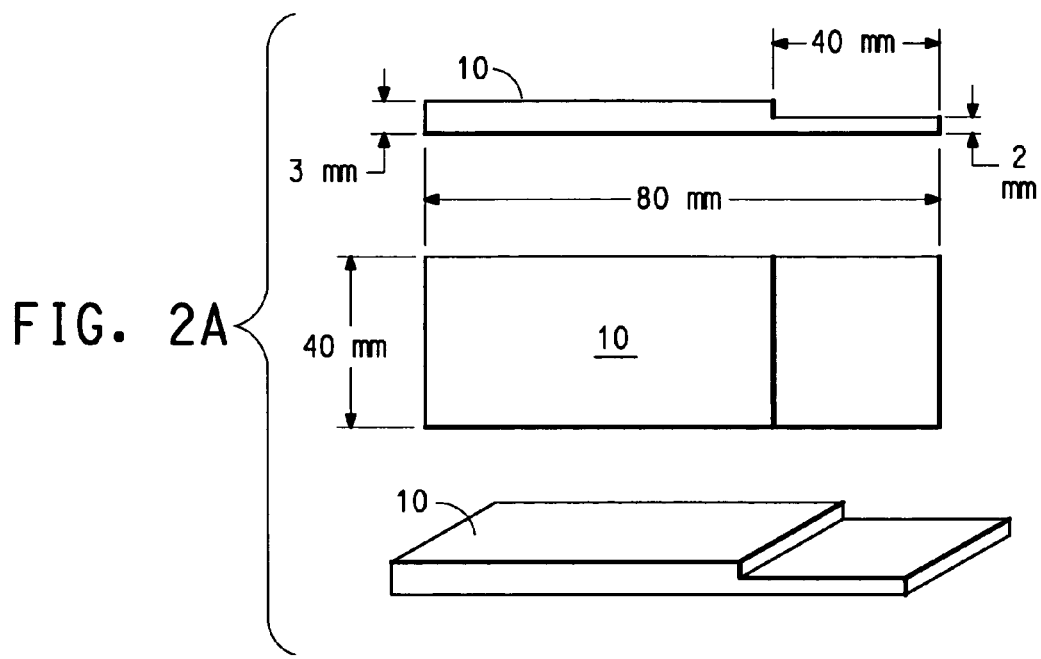
FIG. 2(A) illustrates a shape and dimensions of the test piece for the laser welding test with Examples 24-28, 30-31 and Comparative Examples 29, 32-36.
Figure 2B:
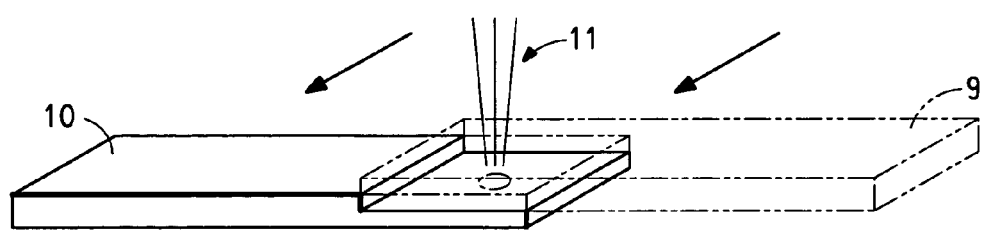
FIG. 2(B) is a perspective view of test pieces disposed close to each other for a laser welding test and relationship between the test pieces and laser beam with Examples 24-28, 30-31 and Comparative Examples 29, 32-36.

In FIGS. 1A and 2A herein, there is shown a lower test piece 10 used in the laser welding test of these examples. The noted dimensions create a notch in the test piece 10. The upper test piece 9 is of the same construction and dimensions. In FIGS. 1B and 2B there is shown the joinder of the upper test piece 9 to lower test piece 10, and the movement of the laser 11 (in the direction of the arrow) to form the weld.

EXAMPLES

The present invention will be better understood upon having reference to the following examples. These are merely illustrative of the wide range of compositions contemplated as within the scope of the invention.

Examples 1-8 describe the black resin compositions for laser transmission.

Example 1

In this Example and the following Examples 2-5 and 9-12, unreinforced nylon 6 (available from E.I. du Pont de Nemours and Co., under the product name of ZYTEL® 7301) was dried at 120° C. for more than 8 hours using a vacuum drying oven. Then the materials were apportioned and weighed according to the specific formulation identified in each Example. The formulations of each of the above-referenced Examples were each agitated and mixed for 1 hour in a stainless steel tumbler.

The formulation for Example 1 is as follows:

| | |
|---|---|
| Nylon 6 | 400 g |
| Monoazo complex black dye of the following Formula (1) (Black colorant for laser transmission) | 0.80 g |

Formula (1):

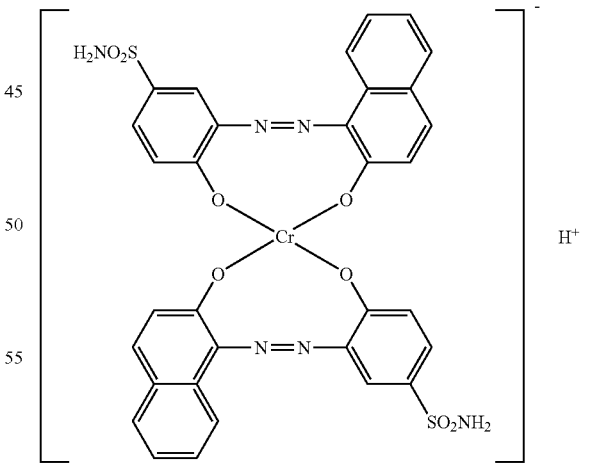

In this and all other examples 2-5, the mixture was then injection molded to form the injection molded test specimens (whose sizes are 48 mm×86mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Example 2

The following formulation was used:

| | |
|---|---|
| Nylon 6 | 400 g |
| Monoazo complex black dye | 0.80 g |

In this instance the complex dye selected was a mixed black colorant for laser transmission having 1:1 as weight ratio of black dye of the following Formula (2) and black dye of the following Formula (3)

Formula (2):

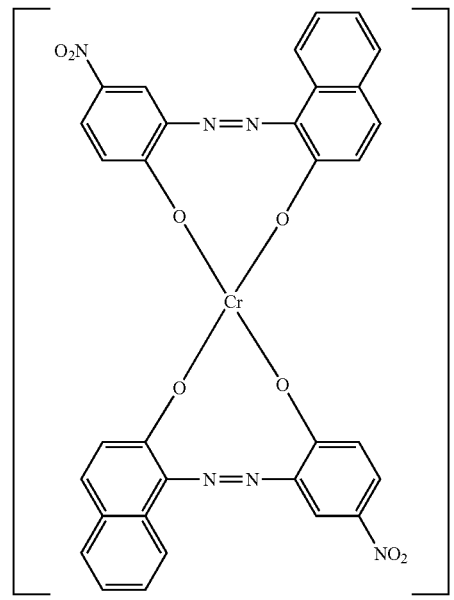

Formula (3):

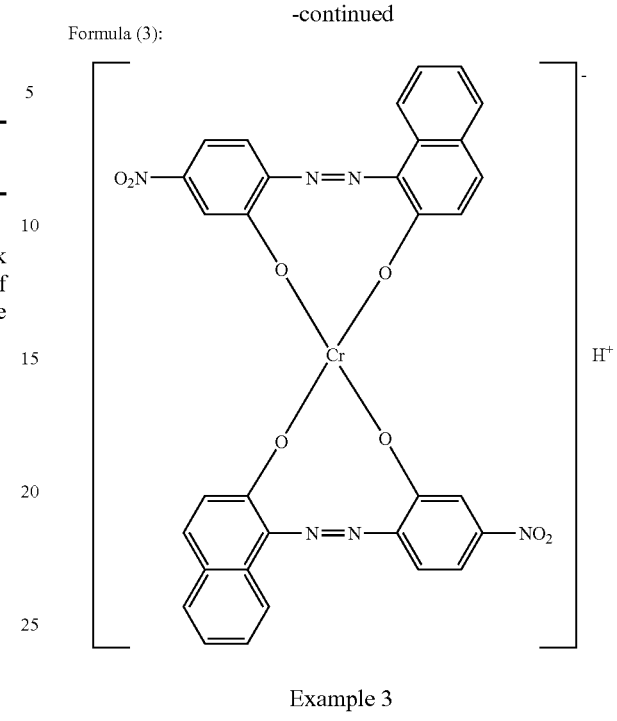

Example 3

The following formulation was used:

| | |
|---|---|
| Nylon 6 | 400 g |
| Monoazo complex black dye | 0.80 g |

In this example the complex dye selected was a mixed black colorant for laser transmission having 1:1 as weight ratio of black dye of the following Formula (4) and orange dye of the following Formula (5)

Formula (4):

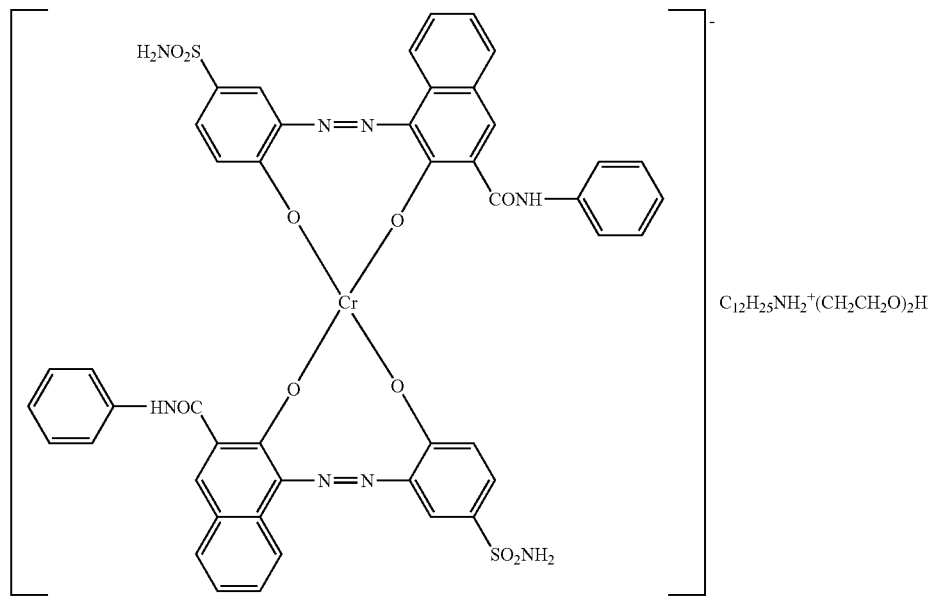

Formula (5):

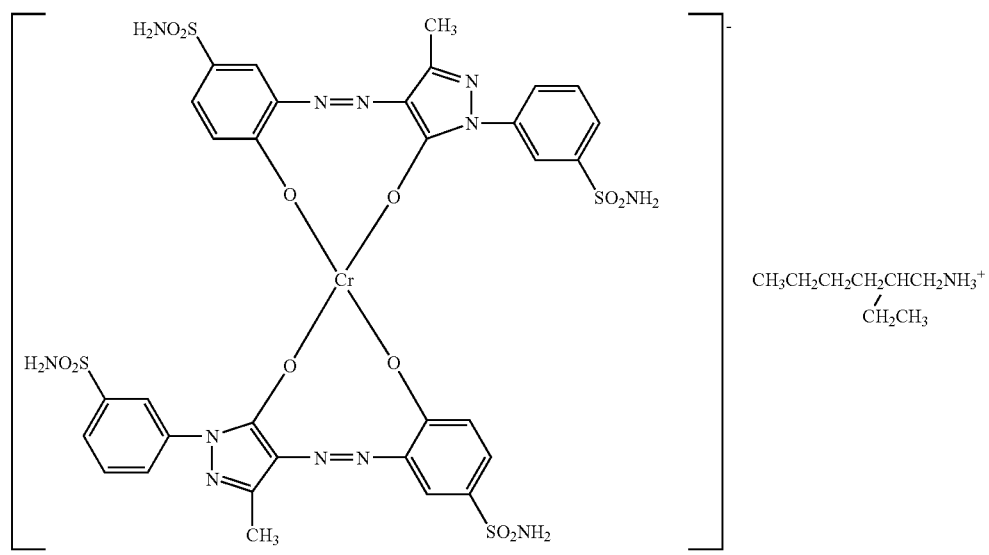

Example 4

The following formulation was used:

| | |
|---|---|
| Nylon 6 | 400 g |
| Anthraquinone blue dye of the following Formula (6) | 0.40 g |
| Perinone red dye of the following Formula (7) | 0.24 g |
| Anthraquinone yellow dye of the following Formula (8) | 0.16 g |

Formula (6):

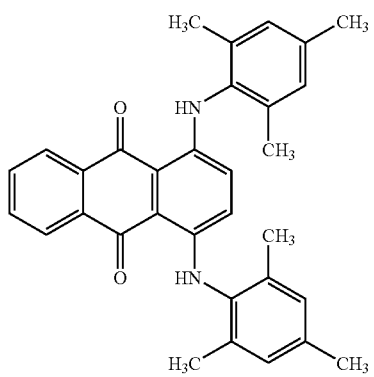

Formula (7):

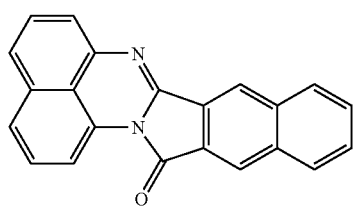

Formula (8):

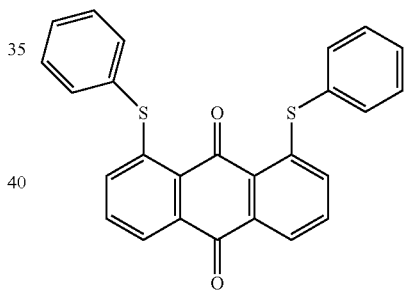

Example 5

The following formulation was used:

| | |
|---|---|
| Nylon 6 | 400 g |
| Anthraquinone blue dye of the following Formula (9) | 0.53 g |
| Perinone red dye of the Formula (7) | 0.18 g |
| Anthraquinone yellow dye of the following Formula (10) | 0.09 g |

Formula (9):

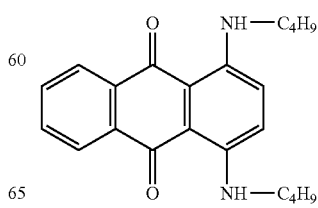

Formula (10):

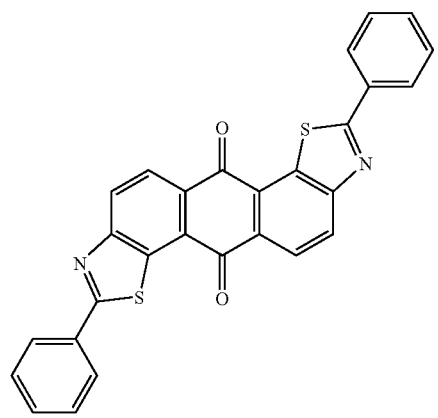

Example 6

In this Example and Examples 7 and 13, unreinforced polyethylene terephthalate (PET) (prepared from terephthalic acid and ethylene glycol the intrinsic viscosity of which is 0.85 when measured at 25° C. as a 1% solution in a mixed solution of phenol and dichlorobenzene with the weight ratio of 1/1) was dried at 140° C. for more than 3 hours using a vacuum drying oven. Then the materials were apportioned and weighed according to the specific formulation identified in each such Example. Each formulation product was agitated and mixed for 1 hour in a stainless steel tumbler.

The formulation for Example 6 is as follows:

| | |
|---|---|
| PET | 400 g |
| Monoazo complex black dye of the Formula (1) | 0.53 g |
| Monoazo complex red dye of the following Formula (11) | 0.18 g |
| Monoazo complex orange dye of the following Formula (12) | 0.09 g |

Formula (11):

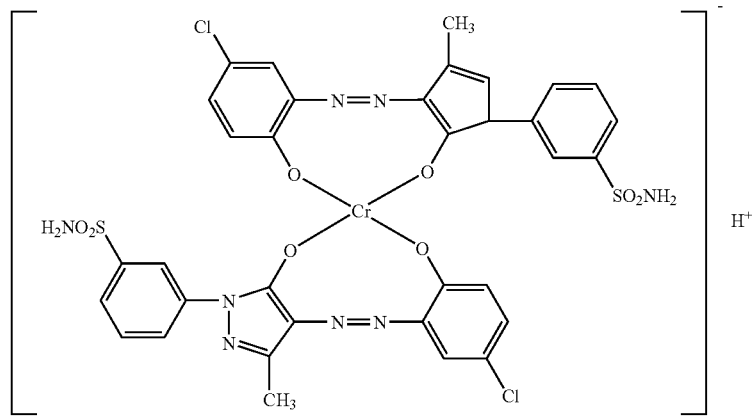

Formula (12):

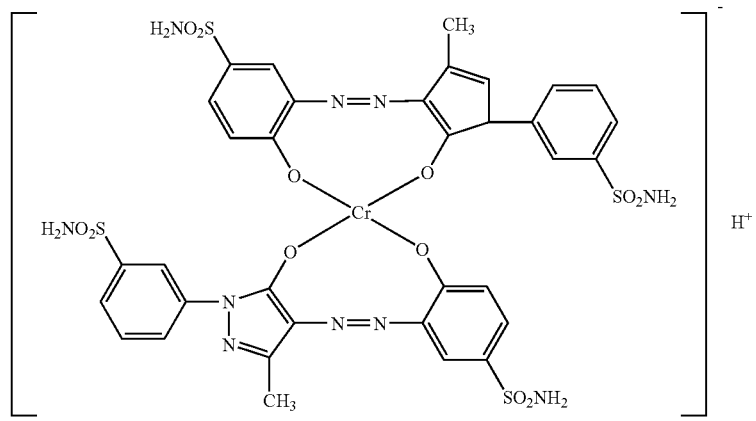

The mixture was then injection molded to form the injection molded test specimens (whose sizes are 48 mm×86 mm×3 mm) using K50-C produced by Kawaguchi Steel K.K. and the cylinder temperature was set to 280° C. Mold temperature was 60° C. Good and uniformly black appearance and surface gloss without color shading of the specimens were observed.

Example 7

The following formula was used:

| PET | 400 g |
|---|---|
| Anthraquinone blue dye of the formula (6) | 0.40 g |
| Perinone red dye of the formula (7) | 0.24 g |
| Anthraquinone yellow dye of the formula (8) | 0.16 g |

Example 8

In this Example and Example 14, unreinforced polybutylene terephthalate (PBT) (prepared from terephthalic acid and 1,4-butanediol the intrinsic viscosity of which is 1.0 when measured at 25° C. as a 1% solution in a mixed solution of phenol and dichlorobenzene with the weight ratio of 1/1) was dried at 140° C. for more than 3 hours using a vacuum drying oven. Then the materials were apportioned and weighed according to the specific formulation identified in each such Example. Each formulation product was agitated and mixed for 1 hour in a stainless steel tumbler.

The formulation for Example 8 is as follows:

| PBT | 400 g |
|---|---|
| Anthraquinone blue dye of the formula (6) | 0.40 g |
| Perinone red dye of the formula (7) | 0.24 g |
| Anthraquinone yellow dye of the formula (8) | 0.16 g |

The mixture was then injection molded to form the injection molded test specimens (whose sizes are 48 mm×86 mm×3 mm) using K50-C produced by Kawaguchi Steel K.K. and the cylinder temperature was set to 260° C. Mold temperature was 60° C. Good and uniformly black appearance and surface gloss without color shading of the specimens were observed.

Test Procedures (1) Determination of Transmission Rate

A 60φ integration ball-set for UV-visible-near infrared region was placed in a spectrophotometer (Product of Hitachi Co., U-3410 model) and the experimental piece was set in, and the transmission rate T was determined at wavelength range λ=400-1200 nm.

In this case, it was focused on the transmission rate T with the laser utilized, at λ=940 nm (diode laser) and λ=1064 nm (YAG laser), and the scale for evaluation was based on the following transmission rate ratios.

$T_A = T_{940\,nm} / T_{1064\,nM}$ $T_B = T_{940\,nm} / T_{natural\,resin}$ $T_C = T_{1064\,nm} / T_{natural\,resin}$ (2) Test of Appearance and Evaluation For the appearance, the reflective rate (OD value) of the experimental piece was determined using a dual transmission-reflection intensity meter (Product of McBase Co., trade name: TR-927). Test plate having higher OD values are judged to have better surface smoothness and higher gloss.

Test pieces of Examples 1-8 were tested for transmission rate and appearance and evaluation. The results are summarized in the following Table I.

TABLE I

| | Transmission rate ratio | | | |
|---|---|---|---|---|
| Example | $T_A$ | $T_B$ | $T_C$ | OD Value |
| 1 | 0.76 | 0.81 | 1.01 | 2.53 |
| 2 | 0.64 | 0.76 | 0.90 | 2.46 |
| 3 | 0.62 | 0.75 | 0.91 | 2.45 |
| 4 | 0.96 | 1.00 | 0.97 | 2.42 |
| 5 | 0.95 | 0.94 | 0.93 | 2.40 |
| 6 | 0.73 | 0.82 | 0.92 | 1.97 |
| 7 | 0.93 | 0.93 | 0.93 | 1.81 |
| 8 | 0.88 | 0.93 | 1.00 | 1.95 |

Examples 9-14 describe the black resin compositions for laser absorption.

Example 9

The following formulation was used:

| Nylon 6 | 400 g |
|---|---|
| Carbon black (Product of Mitsubishi Kagaku Co., Product name: #960) | 0.80 g |

In this Example and the following Examples 10-12, after the tumbling operation, the mixture was melted and mixed at 250° C. and made into black pellets by cutting at a regular length (2-3 mm), with using a Bent type extruder (commercially available under the product name E30SV from Enpler Industry Co.), and the pellets were dried in a dryer at 80° C. for 3 hours.

The pellet was then injection molded to form the injection molded test specimens (whose sizes are 48 mm×86 mm×3 mm) using K50-C produced by Kawaguchi Steel K.K. and the cylinder temperature was set to 250° C. Mold temperature was 60° C. Good and uniformly black appearance and surface gloss without color shading of the specimens were observed.

Example 10

The following formulation was used:

| Nylon 6 | 400 g |
|---|---|
| Nigrosine type dye (Product of Orient Chemical Industries, LTD., Product name: Nigrosine base SAP) | 0.80 g |

Example 11

The following formulation was used:

| Nylon 6 | 400 g |
|---|---|
| Carbon black (Product of Mitsubishi Kagaku Co., Product name: #960) | 0.60 g |
| Nigrosine type dye (Product of Orient Chemical Industries, LTD., Product name: Nigrosine base EX) | 0.20 g |

Example 12

The following formulation was used:

| | |
|---|---|
| Nylon 6 | 400 g |
| Carbon black (Product of Mitsubishi Kagaku Co., Product name: #960) | 0.08 g |
| Nigrosine type dye (Product of Orient Chemical Industries, LTD., Product name: Nigrosine base EX) | 0.48 g |
| Aniline black (Product of Noma Kagaku Co., Product name: Diamond black S) | 0.24 g |

Example 13

The following formulation was used:

| | |
|---|---|
| PET | 400 g |
| Carbon black (Product of Mitsubishi Kagaku Co., Product name: #960) | 0.80 g |

In this Example, after the tumbling operation, the mixture was melted and mixed at 280° C. and made into black pellets by cutting at a regular length (2-3 mm), with using a Bent type extruder (commercially available under the product name E30SV from Enpler Industry Co.), and the pellets were dried in a dryer at 140° C. for 3 hours.

The pellet was then injection molded to form the injection molded test specimens (whose sizes are 48 mm×86 mm×3 mm) using K50-C produced by Kawaguchi Steel K.K. and the cylinder temperature was set to 280° C. Mold temperature was 60° C. Good and uniformly black appearance and surface gloss without color shading of the specimens were observed.

Example 14

The following formulation was used:

| | |
|---|---|
| PBT | 400 g |
| Carbon black (Product of Mitsubishi Kagaku Co., Product name: #960) | 0.80 g |

In this Example, after the tumbling operation, the mixture was melted and mixed at 270° C. and made into black pellets by cutting at a regular length (2-3 mm), with using a Bent type extruder (commercially available under the product name E30SV from Enpler Industry Co.), and the pellets were dried in a dryer at 140° C. for 3 hours.

The pellet was then injection molded to form the injection molded test specimens (whose sizes are 48 mm×86 mm×3 mm) using K50-C produced by Kawaguchi Steel K.K. and the cylinder temperature was set to 260° C. Mold temperature was 60° C. Good and uniformly black appearance and surface gloss without color shading of the specimens were observed.

Test pieces of Examples 8-14 were tested for transmission rate and appearance and evaluation. The results are summarized in the following Table II.

TABLE II

| | Transmission rate ratio | | | |
|---|---|---|---|---|
| Example | $T_A$ | $T_B$ | $T_C$ | OD Value |
| 9  | 1.02 | *8.0E−4 | *7.0E−4 | 2.32 |
| 10 | 0.11 | *2.4E−3 | *2.0E−2 | 2.36 |
| 11 | 0.37 | *2.2E−4 | *5.6E−3 | 2.40 |
| 12 | 0.31 | *1.8E−4 | *5.2E−3 | 2.43 |
| 13 | 0.91 | *1.5E−4 | *1.1E−4 | 1.91 |
| 14 | 1.00 | *3.5E−4 | *3.2E−4 | 2.20 |

*E: exponential

Examples 15-23 describe the resin fabricated molded products for laser welding.

Laser welding with YAG laser and diode laser was carried out using the experimental resins aforementioned obtained.

YAG Laser Condition:

Nd:YAG laser (Olion510, 1064 nm, continuous) was irradiated with 4 W output onto test piece with 3mm diameter for 3 seconds.

Diode Laser Condition:

Diode laser (SDL-FD25, 820 nm, continuous) was irradiated with 4W output onto test pieces with 3 mm diameter for 10 seconds.

As to laser weldability, in each of Examples 15 through 23, two resin parts that are respectively transparent and opaque for such laser beams and formed of the compositions indicated in the following Table III being welded were judged by visual inspection Welded test pieces were visually inspected and judged OK when adhesion was formed and NG when the two test pieces were not adhered and fell apart or when the surface of transparent part were burnt and damaged.

The results are set forth in Table III.

TABLE III

| Examples | Composition as Black resin composition for laser transmission | Compositions as Black resin composition for laser absorption | Laser | Laser weldability |
|---|---|---|---|---|
| 15 | Example 1 | Example 9  | YAG   | OK |
| 16 | Example 2 | Example 11 | YAG   | OK |
| 17 | Example 6 | Example 13 | YAG   | OK |
| 18 | Example 1 | Example 9  | Diode | OK |
| 19 | Example 4 | Example 9  | Diode | OK |
| 20 | Example 4 | Example 11 | Diode | OK |
| 21 | Example 5 | Example 10 | Diode | OK |
| 22 | Example 7 | Example 13 | Diode | OK |
| 23 | Example 8 | Example 14 | Diode | OK |

Examples 24-28, 30-31,

Comparative Example 29, 32-36

Unreinforced Nylon 66 (Zytel®101, available from E. I. DuPont de Nemours and Co.) and dyes and pigments were dry-blended with the amount described on the table IV-1 and IV-2. The blended material was molded into the test pieces for laser welding, with dimension illustrated as FIG. 2A, using an injection molding machine (K50-C, a product of Kawaguchi Tekko Co.) with cylinder temperature set at 270° C. and mold temperature set at 65° C. Light transmittance at 940 nm was measured using 2-mm thick area of this molded test plate using a spectrophotometer (product of Hitachi Co., U-3410 model). Laser welding was conducted using two pieces of the test pieces combined as illustrated in FIG. 2B. Each example from 24 to 28, comparative example 29, example from 30 to 31, and comparative example from 32 to 35 was used as the Lower test piece and Comparative Example 36 was used as the Upper test piece. Diode laser (wavelength 940 nm, manufactured by Rofin-Sinar Laser GmbH) was irradiated with laser power at 80 W and with speed at 1 m/min. Welded test pieces were visually inspected and judged OK when uniform adhesion was formed across the test piece, and judged NG, when the two test pieces were not adhered and fell apart, when the adhesion was not formed uniformly across the test piece, or when the surface of transparent part was burnt and damaged

TABLE IV-1

|  | Example 24 | Example 25 | Example 26 | Example 27 | Example 28 | Comp. Ex. 29 |
|---|---|---|---|---|---|---|
| Zytel ® 101 | 499.25 | 499.5 | 499.65 | 499.75 | 499.85 | 499.95 |
| Carbon black | 0.75 | 0.5 | 0.35 | 0.25 | 0.15 | 0.05 |
| *Transmittance | 0 | 0 | *4.0E−4 | *2.5E−3 | *2.9E−2 | 0.22 |
| Laser weldability | OK | OK | OK | OK | OK | NG |

*transmission rate ratio ($T_{\text{black resin for laser absorption}}/T_{\text{natural resin}}$)
*E: exponential

TABLE IV-2

|  | Example 30 | Example 31 | Comp. Ex. 32 | Comp. Ex. 33 | Comp. Ex. 34 | Comp. Ex. 35 | Comp. Ex. 36 |
|---|---|---|---|---|---|---|---|
| Zytel ® 101 | 499.25 | 499.5 | 499.65 | 499.75 | 499.85 | 499.95 | 500 |
| Nigrosine dye | 0.75 | 0.5 | 0.35 | 0.25 | 0.15 | 0.05 | 0 |
| *Transmittance | 3.6E−2 | 0.10 | 0.21 | 0.28 | 0.49 | 0.72 | — |
| Laser weldability | OK | OK | NG | NG | NG | NG | — |

*transmission rate ratio ($T_{\text{black resin for laser absorption}}/T_{\text{natural resin}}$)
*E: exponential The Examples from 24 to 28, 30, and 31 which had transmittance, as expressed as transmission rate ratio as defined above, less than 0.20 exhibited laser weldability. But the Comparative Examples 29, and from 32 to 35, which had transmittance greater than 0.20 did not have laser weldability.

Examples 37-49

Comparative Example 50

Unreinforced Nylon 66 (Zytel®103FHS, available from E. I. DuPont de Nemours and Co.) and dyes and pigments were dry-blended with the amount described on the table IV. The blended material was molded into the test pieces for laser welding, with dimension illustrated as FIG. 1A, using an injection molding machine (Sumitomo Juki 75T) with cylinder temperature set at 270° C. and mold temperature set at 65° C. Laser welding was conducted using two pieces of the test pieces combined as illustrated in FIG. 1B. Each example from 37 to 49 was used as the Lower test piece and Comparative Example 50 was used as the Upper test piece. Diode laser (wavelength 940 nm, manufactured by Rofin-Sinar Laser GmbH) was irradiated with laser power at 120 W and with various speeds. Tensile strength of the welded test pieces was measured on Autograph (manufactured by Shimazu Seisakusho) by pulling apart at 5mm/minute and its maximum load was recorded. In case Laser welding strength is more than 70, we consider that it can use in industrial welding.

TABLE V

|  | Example 37 | Example 38 | Example 39 | Example 40 | Example 41 | Example 42 | Example 43 | Example 44 | Example 45 | Example 46 | Example 47 | Example 48 | Example 49 | Comp. Ex. 50 |
|---|---|---|---|---|---|---|---|---|---|---|---|---|---|---|
| Zytel ® 103FHS | 499.5 | 499.0 | 498.75 | 497.5 | 498.5 | 497.0 | 498.75 | 498.75 | 497.5 | 498.25 | 498.0 | 498.25 | 498.25 | 500 |
| Carbon black | 0.5 | 1.0 |  |  |  |  |  | 0.125 | 0.25 | 0.5 | 0.5 | 0.5 | 0.625 |  |

TABLE V-continued

| | Example 37 | Example 38 | Example 39 | Example 40 | Example 41 | Example 42 | Example 43 | Example 44 | Example 45 | Example 46 | Example 47 | Example 48 | Example 49 | Comp. Ex. 50 |
|---|---|---|---|---|---|---|---|---|---|---|---|---|---|---|
| Nigrosine type dye 1* | | | 1.25 | 2.5 | | | | | 0.75 | 1.50 | 1.25 | | | 0.75 |
| Nigrosine type dye 2* | | | | | 1.5 | 3.0 | 0.95 | | | | | 1.5 | 0.95 | |
| Aniline black | | | | | | | 0.25 | 0.375 | 0.75 | | | 0.25 | 0.375 | |
| Phthalocyanine black | | | | | | | 0.05 | | | | | 0.05 | | |
| Laser welding speed | Laser welding strength (kgf) | | | | | | | | | | | | | |
| 2.5 m/min | 44 | | 93 | | 90 | | 84 | 78 | | | | | | |
| 5 m/min | 77 | 86 | 105 | 99 | 118 | 89 | 97 | 103 | 79 | 103 | 120 | 103 | 93 | |
| 10 m/min | 48 | 102 | 51 | 134 | 74 | 161 | 0 | 0 | 132 | 126 | 145 | 114 | 106 | |
| 13 m/min | | 99 | | 117 | | 145 | | | 130 | 126 | 129 | 92 | 121 | |
| 20 m/min | | 9 | | 7 | | 17 | | | 0 | 29 | 31 | 29 | 15 | |

Nigrosine type dye 1*: Nigrosine base SAP produced by Orient Chemical Industries, Ltd.
Nigrosine type dye 2*: Cramity 81 produced by Orient Chemical Industries, Ltd.

The invention claimed is:

1. A method of laser welding, comprising the steps of:
preparing a first molded article comprising a thermoplastic, the first molded article being transparent to a laser beam used for laser welding;
preparing a second molded article comprising a thermoplastic resin and a laser beam absorbing black colorant, the second molded article having a transmission rate ratio ($T_{black\ resin\ for\ laser\ transmission}/T_{natutal\ resin}$) of 0-0.2 wherein $T_{black\ resin\ for\ laser\ transmission}$ means the transmission rate of the second molded article and $T_{natural\ resin}$ means the transmission rate of the thermoplastic resin alone for the laser beam, the laser beam absorbing black colorant comprising a carbon black and a nigrosine dye;
positioning the first molded article and the second molded article in contact with each other; and
transmitting a laser beam energy focused on the area of contact through the first molded article to the second molded article.

* * * * *